United States Patent [19]

Maegli

[11] Patent Number: 5,298,268
[45] Date of Patent: Mar. 29, 1994

[54] SEASONED SNACK FOODS AND METHODS FOR PRODUCTION THEREOF

[75] Inventor: Jack W. Maegli, Beloit, Wis.

[73] Assignee: Beatreme Foods Inc., Beloit, Wis.

[21] Appl. No.: 933,236

[22] Filed: Aug. 21, 1992

[51] Int. Cl.⁵ ............................ A23G 3/00; A23L 1/09
[52] U.S. Cl. ..................................... 426/93; 426/98;
426/103; 426/233; 426/272; 426/292; 426/293;
426/302; 426/309
[58] Field of Search ............... 426/93, 98, 96, 103,
426/272, 292, 302, 309, 658, 660

[56] References Cited

U.S. PATENT DOCUMENTS

| | | | |
|---|---|---|---|
| 3,840,685 | 10/1974 | Lyall et al. | 426/103 |
| 4,089,984 | 5/1978 | Gilbertson | 426/103 |
| 4,372,942 | 2/1983 | Cimiluca | 426/103 |
| 4,451,488 | 5/1984 | Cook et al. | 426/103 |
| 4,702,925 | 10/1987 | Verrico | 426/103 |

Primary Examiner—Helen F. Pratt
Attorney, Agent, or Firm—Griffin, Butler, Whisenhunt & Kurtossy

[57] ABSTRACT

A low fat content, seasoned, cereal-based snack food having a low moisture content is produced. An adhesive for the seasoning is an at least partially amorphous form of a mixture of at least one monosaccharide, preferably glucose, and at least one polyhydric, aliphatic, saturated alcohol having 3 to 6 carbon atoms, preferably glycerol. The adhesive is applied to the snack food by direct spraying on the snack food or by encapsulating the adhesive in a fat and blending the encapsulated adhesive with the snack food.

37 Claims, No Drawings

SEASONED SNACK FOODS AND METHODS FOR PRODUCTION THEREOF

The present invention relates to a seasoned cereal-based snack food, and more particularly to such a snack food having a low fat and low moisture content edible adhesive on the surfaces thereof for adhering dry solids seasoning to the surfaces of the snack food.

BACKGROUND OF THE INVENTION

Cereal-based snack foods are quite popular and may take a variety of specific forms, such as seasoned corn curls, taco chips, tortilla chips, crackers, etc., all of which, usually, require some seasoning at least on the surfaces thereof. That seasoning must be adhered to those surfaces by an edible adhesive, and in the past, that adhesive has most usually been an oil or fat. For example, when a potato chip is produced (potatoes being considered cereal for the purposes of this invention), sliced potatoes are deep fat fried. After removal from the fryer, the potato chips have considerable oil or fat on the surfaces thereof, and when dusted with a seasoning, e.g. salt, the salt adheres to the surfaces of the potato chips by way of a residual fat functioning as an adhesive. Corn chips, such as taco chips and tamale chips, may be likewise produced, but here the seasoning will be a mixture of flavors and, usually, salt. As another example, corn curls and crackers are often flavored with cheese powder. Corn curls, for example, after puffing from dough, may be sprayed with an oil, and then the cheese powder adhered to the surfaces thereof by way of the oil functioning as an edible adhesive. Crackers are usually leavened and baked, and likewise require oil sprayed on the surfaces to function as an adhesive, e.g. an adhesive for seasonings, including cheese powders.

However, for dietary purposes, it is often important to reduce the fat intake, and snack foods, as described above, have been produced with reduced fat contents, the reduction in fat content being both in regard to the fat in the formulations of doughs for forming the snack food and in the fat used in the adhesive for the seasoning. For example, a cracker may be baked with a relatively low fat content, but with that low fat content, sufficient residual fat does not remain on the cracker for adequately adhering seasonings to the surfaces of the cracker. If additional fat is placed on the crackers for adhesive purposes, that additional fat would defeat, to a large measure, the purpose of providing a low fat dough for producing the cracker.

As a result, the art has sought low fat adhesives for snack foods of the nature described above. Various substitutes for the traditional fat adhesives have been proposed in the art. Many of these proposals involve water solutions of various edible ingredients which, when applied and dried on the snack food, provide a tacky adhesive for adhering the seasonings. These approaches, however, suffer from a common difficulty. Since such snack foods are intended to be shelf stable, the moisture content of the snack food (or at least the water activity of the snack food) must be at a low level in order to prevent staling and bacterial growth on the snack food during shipping, handling and storing. It is difficult when applying water solutions of such tackifying adhesives to ensure that the water used for application of the adhesive is sufficiently evaporated to reduce the moisture content of the adhesive (and also the snack food) to a safe level of water activity and one that will not induce staling of the substrate, i.e. snack food. This is particularly true when the adhesive material itself is hygroscopic, which is often the case with edible sugars and alcohols. In addition, such hydroscopic adhesives will absorb moisture, particularly when the snack food package is opened, and the snack food may become sticky or tacky and may allow staling and/or bacterial growth.

While not directed to cereal-based snack foods, the problem discussed above has been a considerable problem in other snack food arts, such as in the art of coating nuts. For example, U.S. Pat. No. 3,477,858 discloses that adhesives, such as starch-based adhesives or gums, tend to flake off and produce unsightly fines. Also, it is disclosed that non-oily adhesives, such as sorbitol and mannitol, have difficulty in that, especially, sorbitol remains tacky for long periods of time, e.g. at least 18 hours, after cooling to room temperature, and the nuts tend to adhere to each other. In addition, sorbitol is hydroscopic and the nuts tend to be sticky after exposure to high humidity. On the other hand, mannitol becomes hard and brittle, immediately after removing the nuts from a molten bath thereof, with poor drainage of the mannitol, agglomeration of the nuts, and difficulties in obtaining an adequately seasoned product. That patent goes on to propose a mixture of mannitol and sorbitol for somewhat mitigating these difficulties.

Somewhat similarly, U.S. Pat. No. 3,671,266 proposes coating nuts with a hexitol, e.g. mannitol, sorbitol and mixtures thereof, wherein at least 10% sorbitol is used.

U.S. Pat. No. 4,161,545 recognizes the above-discussed U.S. Pat. No. 3,671,266, but points out that the approach of that patent produces dark-colored nuts, and instead proposes a mixture of honey and water followed by enrobing with a dry mixture of sugar and starch.

However, U.S. Pat. No. 4,692,342 recognizes the above-described U.S. Pat. No. 4,161,545, but states that improved adhesion of seasoning can be achieved when the nuts are coated with a dry adhesive film-forming material and then with an aqueous mixture of honey and an adhesive film-forming material. Adhesive materials such as vegetable gums, dextrin, modified starches, albuminoids, and the like are suggested.

Somewhat similar problems are also encountered in producing ready-to-eat food bars, e.g. commonly referred to an "granola bars", and in those bars the binders are usually sugar syrups, shortening or the like. However, glycerine had also been proposed as the binder, but as U.S. Pat. No. 4,605,561 points out, in order to keep such food products from spoiling, the water activity ($A_W$), in general, must be less than about 0.9, and hydroscopic materials can cause difficulties in this regard, especially polyhydric alcohols, such as sorbitol and glycerol. That patent then goes on to propose a fondant of sucrose, corn syrup, fat and water as the binder.

U.S. Pat. No. 4,451,488 points out that the polyhydric alcohols may be used, in such food bars, but used in combination with a binder system that includes sugars, shortening and a combination of sorbitol and glycerol.

Cereal grains involve something of a similar problem, and U.S. Pat. No. 3,806,613, directed to a fortifying coating on cereal grain products, states that adhesive films of gums, shellac and the like have been used in the past for such purposes, but points out that edible fatty acid esters of glycerol or sorbitol provide better results, especially for iron-fortified cereals.

Something of the same problem is also found in connection with dried fruits. For example, U.S. Pat. No. 4,363,825 relates to dried and shredded coconut and points out that glycols, such as propylene glycol, butylene glycol or glycerol, function as humectants for such products, which allow easy rehydration of the shredded coconut. To achieve low moisture content, the patent goes on to propose a coating of glycerol monostearate, glycerol, propylene glycol, maltodextrin, creamed coconut and salt.

As can be, therefore, easily appreciated, the art has recognized a number of difficulties in connection with adhesive coatings and binders for various foods. The specific problems vary, considerably, with the particular food involved, as briefly discussed above, but the common denominator of these difficulties is that of finding adequate materials to function in lieu of the traditional fats, for binding and adhesive purposes, for the particular food involved.

It would, therefore, be of substantial benefit in the art to provide an adhesive for a snack food which has both low fat content, for dietary purposes, and low moisture content, for storage-stable purposes, and which adhesive can adequately adhere seasoning to the surface of a cereal-based snack food, which snack food and the surfaces thereof present their own set of difficulties, especially that of absorption of the adhesive into the snack food itself. At the same time, it would be important to the art to provide such adhesives which are not brittle, such as aqueous applied and dried monosaccharides, i.e. sugars, but on the other hand, are not humectants which can increase water activity on storage, such as polyhydric alcohols. It would be a further advantage to the art to provide such adhesives which will firmly adhere the seasonings, but which will not become tacky and adhere the seasoned pieces of snack food together during handling, storage and use.

BRIEF DESCRIPTION OF THE INVENTION

The invention is based on several primary discoveries and several subsidiary discoveries. First of all, as a primary discovery, it was found that an aqueous applied adhesive could be rendered into a low water activity adhesive, with low moisture content or low water activities, when the adhesive is in the at least partially amorphous state, as opposed to the more generally non-amorphous state of aqueous applied sugar adhesive solutions.

As a second major discovery, it was found that the amorphous state of such aqueous applied adhesives could be achieved by including in the aqueous solution for application to the snack food a compound which would otherwise function as a humectant, i.e. a polyhydric alcohol.

Thirdly, as a major discovery, it was found that such an at least partially amorphous adhesive could be made from a mixture of at least one monosaccharide and at least one polyhydric, aliphatic, saturated alcohol having 3 to 6 carbon atoms.

As a subsidiary discovery, it was found that certain monosaccharides, i.e. glucose, mannose, galactose and fructose, are particularly useful in such an at least partially amorphous adhesive. Further, in such an at least partially amorphous adhesive, it was found that certain polyhydric alcohols, i.e. glycerol, sorbitol and mannitol, are particularly useful in forming such an at least partially amorphous adhesive, in combination with the monosaccharides.

As another subsidiary discovery, it was found that glucose and glycerol form a very effective amorphous adhesive, particularly when used in ratios of between about 0.5:1 and 8:1.

As a further subsidiary discovery, particularly when the adhesive is applied directly from a water solution, it was found that salts, e.g. sodium and calcium salts, improve the adherence of the amorphous adhesive to the snack food and decrease hygroscopicity, and that, particularly, calcium chloride is most effective in this regard.

As a further subsidiary discovery, it was found that with the use of such at least partially amorphous adhesives, problems could be experienced in coating the adhesive on the snack food, in that the adhesive and snack food could adhere to the walls of the container in which the adhesive is applied to the snack food, e.g. a tumbler, but that this problem could be overcome by placing in the adhesive a small amount of an anti-stick agent, such as a small amount of fat.

It was also found that specific methods must be provided for adequately applying the at least partially amorphous adhesive to the snack food, and these methods include, among others, particular steps and temperatures for such application.

Thus, very briefly stated, the present invention provides a low fat content, seasoned, cereal-based snack food having a low fat and low moisture content (low water activity) edible adhesive on surfaces thereof and edible dry solids seasoning adhered to the surfaces by the adhesive. The improvement provided by the present invention is where the adhesive comprises an at least partially amorphous form of a mixture of at least one monosaccharide and at least one polyhydric, aliphatic, saturated alcohol having 3 to 6 carbon atoms.

In a method for producing the snack food, a mixture is formed of the at least one monosaccharide and at least one polyhydric alcohol and a co-solvent therefore. The mixture is heated to at least the amorphous causing temperature (usually above the melting point of the monosaccharide and alcohol) and for a time sufficient to cause the mixture to become an at least partially amorphous mixture. The amorphous mixture is cooled to a lower temperature where the viscosity and surface tension of the amorphous mixture substantially prevents absorption of the amorphous mixture into the snack food. The amorphous mixture is sprayed onto the snack food to coat the snack food with the amorphous mixture. The seasoning is then applied to the so-coated snack food, and the seasoned snack food is cooled to a temperature where the amorphous mixture is no longer substantially tacky. Thus, the seasoning is substantially firmly adhered to the snack food.

In another form of the process, a mixture is formed of the at least one monosaccharide, the at least one polyhydric alcohol, an edible fat having a melting point between 100° F. and 165° F., and an emulsifier for the fat. That mixture is stirred and heated to at least the amorphous-causing temperature for a time sufficient to cause the mixture to become amorphous and to form a solvent-in-oil emulsion. The emulsion is atomized, e.g. spray chilled, to encapsulate the amorphous mixture in the fat and provide small particles thereof. The particles are blended with the snack food and the seasoning to form a blend thereof, and the blend is heated to a melt temperature sufficient to cause the fat to melt and distribute the amorphous mixture over the snack food and to adhere the seasoning to the snack food. The seasoned snack food is then cooled to a temperature where the amorphous mixture is no longer substantially tacky. Thus, the seasoning is substantially firmly adhered to the snack food.

DETAILED DESCRIPTION OF THE PREFERRED EMBODIMENTS OF THE INVENTION

As noted above, the invention is directed to a low fat content, seasoned, cereal-based snack food having a low fat and low moisture content (low water activity) edible adhesive on surfaces thereof. Typically, the snack food of the present invention will have less than about one third of the fat of usual oil adhesive snack foods. For example, in a snack food cracker, when the seasoning is adhered with oil, the total oil content of the cracker is about 11%. With that same cracker, but when the seasoning is adhered with the present amorphous-form adhesive, the fat content will typically be about 1½%. Thus, the present invention, truly, provides a low fat content snack food. On a broader plane, the fat content of the present adhesive will be from zero up to about 10%, which should be contrasted with oil-base adhesives which are, typically, nearly 100% fat.

The moisture content of the present snack food will be low, and, including the moisture content of the adhesive, will typically have a water activity less than about 0.60. In addition, due to the amorphous nature of the adhesive, the water activity of the adhesive is exceptionally low, e.g. typically a water activity of about 0.80 or less.

The adhesive can be applied to any cereal-based snack food (potatoes being including in the present definition of cereal for purposes of the present specification and claims) and, typically, the snack foods are made of corn, barley, oats, wheat, rice and the like. The snack food may be puffed, partially puffed, or substantially unpuffed, e.g. a corn curl, a cracker or a chip. However, in order to keep a low fat content of the snack food, the snack food will be normally baked, although some small amount of deep fat frying may be used, particularly after a baking step.

The seasoning may be any conventional edible seasoning, e.g. salt, sugar, tomato powders, onion and garlic powders, sour cream powders, cheese powders, spices, peppers, etc., and the particular seasoning may be chosen as desired; it is not critical to the invention.

The adhesive will be disposed on surfaces of the snack food. Usually, a relatively uniform disposition of the adhesive on substantially all of the surfaces of the snack food will be required, although for certain applications of seasoning, it may not be necessary for such substantial covering of the surfaces with the adhesives, e.g. where localized seasoning is intended.

The adhesive must be in an at least a partially amorphous form, preferably substantially amorphous, but, at least, with small amounts of crystallization, e.g. no more than 40% of the adhesive may be in a crystalline form, more preferably no more than 30%, and usually less than 10%, and conversely the adhesive is at least 60% amorphous, etc.

Normally, the adhesive, as a consequence of being amorphous, will also be supersaturated with respect to at least one of the polyhydric alcohol and the monosaccharide, and often with respect to both. With such mixtures of the polyhydric alcohol and monosaccharide, the amorphous-caused supersaturation with respect to at least one of the alcohol or monosaccharide will so form the adhesive to reduce water activity and elevate surface tension (to prevent the adhesive from being imbibed by the snack substrate), at least when in a form having the low crystallizations described by the above. Of course, the need for the amorphous-caused supersaturation at all, to achieve the desired state of the adhesive, will strongly depend on the particular alcohol and monosaccharide used, as well as the proportion thereof. With some alcohols and monosaccharides, only one of these need be in the amorphous-caused supersaturated form, while with others both should be, and while with others the amorphous-caused supersaturation is not required, in order to reach the low levels of crystallization of the amorphous form, as described above. This can easily be determined, however, by imperically determining the correct amorphous form,, with the low levels of crystallization, for any particular combination and proportions of alcohol and monosaccharide.

The particular monosaccharide or monosaccharides are not critical, so long as the monosaccharides will form an amorphous form, and the monosaccharides may be selected from aldopentoses, aldohexoses, and ketohexoses, and mixtures thereof. However, preferably, the monosaccharides are glucose, mannose, galactose and fructose, or mixtures thereof, and the most preferred monosaccharide is glucose.

Likewise, the polyhydric alcohol is not particularly critical, again, so long as in combination with the monosaccharide, the required amorphous form of the adhesive will be formed. However, glycerol, sorbitol and mannitol, and mixtures thereof, have been found to the particularly useful for this purpose, and are preferred. The most preferred polyhydric alcohol is glycerol, and, hence, the most preferred combination of monosaccharide and polyhydric alcohol is that of glucose and glycerol.

The weight ratio of the monosaccharide to alcohol, and particularly in regard to the preferred combination of glucose and glycerol, is between about 0.5:1 and 8:1. This will form the amorphous adhesive, but for a better balance of properties, it is preferred that that ratio be between 1:1 and 4:1.

Especially when the adhesive is applied directly from a water solution, the adhesive may contain at least one edible salt, especially sodium and calcium salts or mixtures thereof, and more preferably sodium or calcium chloride or mixtures thereof. The preferred form is where the salts are both sodium chloride and calcium chloride. Calcium chloride (hydrated) will form a gel with most water soluble proteins in the seasoning (many seasonings contain water soluble protein), especially when the seasoning protein content is at least about 20% or greater. This gel will deter hygroscopicity which might be otherwise associated with some of the present ingredients, e.g. glycerol, sorbitol and glucose, having humectant properties. For example, many seasonings will have protein contents, such as 20% or more of sodium caseinate, e.g. cheese powders and the like, and the gel formed with the salt, particularly calcium chloride, is very useful in lowering the hygroscopicity of the adhesive. If the seasonings do not contain such protein, for reduced hygroscopicity, low levels of such protein, e.g. sodium caseinate, may be added to the seasoning prior to application to the snack food. For this purpose, at least about 20% protein and up to about 50% protein may be added to the seasoning.

As briefly noted above, with the present low fat or no fat adhesive, it is possible that some of the adhesive or seasoning may adhered to the walls of the apparatus in which the adhesive/seasoning is applied to the snack food. This is normally not a problem with conventional oil adhesives, since the oil functions as an anti-stick agent in such circumstances. With particular apparatus, e.g. anti-stick coated apparatus, e.g. Teflon-coated apparatus, such sticking may not be a difficulty, but to prevent sticking, a small amount of fat/oil may be used in the adhesive, typically from 1% up to 15%, more usually less than 10%, and very typically about 5% or less. Any edible fat/oil may be used in this regard, but preferably an oil is used, since this provides better anti-stick properties. More preferably, for dietary purposes, the oil is a vegetable oil, e.g. soybean oil. However, irrespective of the particular fat and/or oil, good anti-stick properties can be achieved, generally, when the weight ratio of the monosaccharide to the fat and/or oil is between about 20:1 and 6:1.

Of course, the adhesive will have residual amounts of the co-solvent for the monosaccharide and polyhydric alcohol. While a variety of co-solvents may be used, e.g. ethyl alcohol, since the monosaccharides are water soluble and the present polyhydric alcohols may be chosen so as to be water soluble, water is the preferred co-solvent.

Finally, the adhesive may contain flavors, if desired, and in certain cases, the adhesive may also contain seasoning. For example, where a peppery taste is to be imparted to the snack food, pepper oils may be included in the adhesive, to give a pepper background flavor to the snack food.

Snack food, with the above-described adhesive, can be prepared by direct application of the adhesive to the snack food, or it can be applied by an indirect application of the adhesive to the snack food. In the direct application method, the adhesive is prepared and sprayed directly on the snack food. In the indirect method, the adhesive is prepared in an encapsulated form, and the encapsulated form is applied to the snack food (mostly in a blend with the desired seasoning).

In the direct application form, a mixture is formed of the at least one monosaccharide and the at least one polyhydric alcohol and a co-solvent therefore, e.g. typically water, the preferred co-solvent. The mixture is then heated to at least the amorphous-causing temperature. The amorphous-causing temperature will, of course, vary with the particular monosaccharide, the particular polyhydric alcohol, and the ratios thereof, as well as the amount of water in which the monosaccharide and alcohol are dissolved. However, generally speaking, the amorphous-causing temperature is generally above the melting point of the highest melting point component of the adhesive, but generally will be at least 150° F., and more usually at least 200° F., and up to about 350° to 400° F. The particular amorphous-causing temperature must be imperically determined for any combination of monosaccharide, alcohol and water. The mixture is allowed to dwell at that temperature for a time sufficient to cause the mixture to become at least partially amorphous, as defined above. Here again, that time will vary considerably with the particular monosaccharide, alcohol and amount of water, but, generally speaking, the mixture will become amorphous in a relatively short time, e.g. about one minute or in about five minutes, and usually less than in about thirty minutes.

After the mixture has become at least partially amorphous, the amorphous mixture is cooled to a lower temperature where the viscosity and surface tension increases to such a point that the amorphous mixture is substantially prevented from being absorbed into the snack food. The lower temperature will, of course, not only depend upon the particular monosaccharide, alcohol and amount of water, but also on the surface of the snack food to which the adhesive is being applied. It is important, however, that the viscosity and surface tension of the amorphous mixture be such that the adhesive is not substantially absorbed into the snack food, but substantially remains on the surface thereof. This viscosity and surface tension, and hence the lower temperature, must be determined imperically for any particular snack food and any particular amorphous adhesive. In any event, the lower temperature to which the adhesive is cooled must be sufficient that the viscosity and surface tension of the adhesive is high enough that when the adhesive is sprayed onto the snack food, the adhesive remains, largely, on the surface of the snack food, and is not substantially absorbed thereinto, e.g. no more than 30%, preferably no more than 10%, is absorbed into the snack food. While this lower temperature must be determined imperically, in most cases, that lower temperature will be at least below 175° F., and usually at least below 160° F., e.g. somewhere between about 120° F. and 160° F.

The cooled amorphous mixture is then applied, e.g. sprayed, onto the snack food to coat surfaces of the snack food with the amorphous mixture. Any conventional spraying device may be used in this regard, but preferably a conventional atomizing spraying device is used (e.g. an air atomizing nozzle), since such conventional devices will produce small droplets of the adhesive and more uniformly coat the snack food.

After applying the adhesive, the seasoning is applied to the so-coated snack food. Here again, the particular means of applying the seasoning is not critical, and the seasoning may be applied in a conventional snack food tumbler, or fluidizing chamber, or the like. Indeed, the adhesive may be sprayed onto the snack food to coat the surfaces thereof in the same apparatus in which the seasoning is applied to the snack food, and, this is a preferred embodiment.

It is also preferable that both the adhesive and the snack food be heated during application of the adhesive. Again, the particular temperature will depend upon the particular adhesive and the particular snack food, but, generally speaking, the snack food and/or the adhesive will be heated to temperatures between about at least 120° and 170° F., e.g. 125° to 175° F., in order to assure even coating of the adhesive and even adherence of the seasoning to the adhesive.

Thereafter the seasoned snack food is cooled to a temperature where the amorphous mixture is no longer substantially tacky. This, again, will depend upon the particular adhesive and the particular snack food, but, generally speaking, the so-seasoned snack food will be cooled to a temperature below about 120° F., especially about 115° F., and more preferably below 100° F., in order to cause the amorphous adhesive to reach very high viscosities and, accordingly, substantially reduce any tackiness.

Thus, the seasoning, by this method, is substantially firmly adhered to the snack food.

In another form of the method for preparing the snack food, a mixture of the at least one monosaccharide, the at least one polyhydric alcohol, an edible fat having a melting point between 100° F. and 165° F., and an emulsifier for that fat is prepared with the co-solvent, e.g. usually water. That mixture is stirred and heated to at least the amorphous-causing temperature, and for a time sufficient to cause the mixture to become amorphous and to form a solvent-in-oil emulsion such that the fat encapsulates the amorphous adhesive. Here again, the required temperature will vary with the particular adhesive and snack foods, and imperical tests must be used to ensure that the adhesive is at least partially amorphous, as defined above. The amorphous-causing temperature, however, can be at least approximately determined in this method, as well as the above-described method, when the mixture becomes substantially translucent. However, with stirring so as to form the solvent-in-oil emulsion, that translucent mixture will again become somewhat opaque, as the emulsion is formed. Thus, by following the light transmission characteristics of the mixture, at least an approximate amorphous-causing temperature can be determined by the translucency of the mixture, and the proper emulsion can be determined when that translucency becomes more opaque.

The edible fat may be any edible fat having the melting points described above. However, conventional fats, such as hydrogenated soybean oil, safflower oil, peanut oil, corn oil, and the like, are quite acceptable.

Likewise, the emulsifier is not critical and may be chosen from a wide range of emulsifiers, such as monoglycerides, sodium stearate, etc., and it is only necessary that the emulsifier be capable of emulsifying the mixture to a solvent-in-oil emulsion, with relatively small emulsion particle sizes, e.g. less than 50 microns.

The stirring and heating to cause the emulsion of the mixture, which has been heated to at least the amorphous-causing temperature, need only be sufficient to cause that solvent-in-oil emulsion so as to fat encapsulate the adhesive, and conventional stirrers are satisfactory in this regard. However, for better dispersal of the encapsulated adhesive onto the snack food, it is preferred that the particle size of the emulsion, and hence the encapsulated adhesive, be quite small, e.g. less than 10 microns or so. To achieve that very small particle size, it is preferred that the stirring is actually by homogenization, in a conventional dairy homogenizer.

Again, the amorphous-causing temperatures will be as described above in connection with the first form of the process, but in this second form of the process, if a lower amorphous-causing temperature is used, that temperature must be sufficient to also melt the fat so that the fat may be emulsified. Since most amorphous-causing temperatures will be about 150° F. or higher, e.g. at least 160° F., usual fats will have a melt temperature less than those amorphous-causing temperatures, particularly when the melting point of the fat is between about 110° F. and 165° F., especially between about 140° F. and 150° F.

The emulsion is atomized, e.g. spray chilled, and this encapsulates the amorphous mixture in the fat in small particles thereof. The spray atomizing may be in any conventional apparatus, i.e. a box dryer or a tower dryer, with the entering air temperatures somewhere between about 40° F. and 100° F., although temperatures outside of this range may be used, for particular adhesives.

The encapsulated particles are then blended with the seasoning and then with the snack food. This blending will be dependent upon the particular snack food. For example, in a corn curl, the corn curls and the adhesive/seasoning mixture are tumbled together or blended in a fluidized bed. On the other hand, when the snack food is a cracker or chip, that mixture of adhesive and seasoning may be simply dusted onto the cracker or chip. In any event, the blending of the encapsulated particles with the snack food and the seasoning is sufficient to cause the required mixture thereof.

Thereafter, the blend is heated to a melt temperature sufficient to cause the fat to melt, distribute the amorphous adhesive mixture over the snack food and to adhere the seasoning to the snack food, i.e. to provide the seasoned snack food. That melt temperature will, of course, simply be the melting point of the fat (or higher) used in producing the encapsulated adhesive, as discussed above.

Alternatively, the snack food may be heated to a higher temperature above the melt point of the fat and then a blend of adhesive/seasoning is added. A combination of this higher temperature and specific heat of the heated snack food must be sufficient to fully melt the encapsulating fat.

Thereafter, the seasoned snack food is cooled to a temperature where the amorphous mixture is no longer substantially tacky, as described above. Here again, therefore, this form of the process provides that the seasoning is substantially firmly adhered to the snack food.

Depending on the particular snack food, the particle size of the encapsulated adhesive can vary considerably. If the snack food has a very small pore size of a porous surface, then, correspondingly, the particle size of the encapsulated adhesive should be small, but on the other hand, where the pore size of the snack food surface is large, the particle size may be large. However, generally speaking, when the average particle size of the encapsulated particles is between about 1 and 500 microns, those particle sizes will be acceptable for almost any snack food.

Since this form of the product will have some fat therein, it is also important that the fat not oil out during transportation and storage. Since transportation and storage temperature can reach 100° F., it is, therefore, preferred that the melt temperature of the fat be at least 100° F., and more preferably, for safety purposes, at least 125° F., e.g. a fat having a melting point between 110° F. and 165° F.

In regard to either the direct spray application method or the indirect encapsulation method, the adhesive may also contain flavors or seasonings. This is not generally preferred, since the high temperatures to which the adhesive have been subjected for causing the amorphous form can cause undesired flavor changes in such flavors and seasonings. However, the more stable flavors and seasonings may be incorporated into the adhesive simply by incorporating those flavors or seasonings into the co-solvent from which the adhesive is made, as described above.

As can be appreciated from the above descriptions of the processes, the monosaccharide/alcohol/water mixture (water being the preferred co-solvent) when heated to the amorphous-causing temperature will cause the crystals of the monosaccharide to dissolve or melt and, in combination with the alcohol, form the amorphous, or glass state, adhesive. In this state, the adhesive resists crystallization when cooled. It is necessary to achieve that amorphous state in order to establish a fluidity of the adhesive for ease of application and to provide a tacky surface to which the seasoning will adhere or bond. However, after prolonged contact with the snack food and seasoning, the moisture in the adhesive will tend to migrate from the adhesive, driving crystallization of the monosaccharide which will form an irreversible bond of the adhesive to the snack food and the seasoning. At that point, of course, the adhesive will, nonetheless, be at least in a partially amorphous form, as described above. Therefore, the moisture content plays a useful role in the adhesive, but on the other hand, the moisture content must not be high enough to induce spalling of the adhesive or wetting of the seasoning or the snack food. The alcohol of the adhesive prevents substantial crystallization of the monosaccharide and, thus, maintains the adhesive at least in the partially amorphous form. This at least partially amorphous form is important to the adhesive, since the adhesive in that form will preserve the integrity and elasticity of the adhesive for both the snack food and the seasoning. This prevents the seasoning from being displaced from the snack food during handling, storage and the like.

As noted above, the adhesive may contain salts, and certain salts, especially sodium chloride, will reduce the natural sweet flavor of many monosaccharides and alcohols. The added salt will also reduce microbial growth during storage and prior to use of the snack food. Of course, microbial growth is strongly influenced by the water activity. While the present adhesive has moisture, as described above, that moisture serves to form the at least partially amorphous form and to reduce viscosity for ease of spray atomization in disposition on the snack food. That water, however, is involved in hydrogen bonding with solutes, and the water activity thereof is substantially reduced, as opposed to free or bulk phase water. However, the amount of water in the adhesive should never be more than that which will produce a water activity greater than 0.9, in combination with any salt added to the adhesive.

In regard to the encapsulation form of the invention, as described above, when the fat, e.g. 145° F. soybean oil stearin, microencapsulates the adhesive, e.g. 5 to 30 micron spheres, this precludes the adhesive from reacting with the seasoning until the melt temperature has been reached, as described above, and the encapsulating fat melts. With such small spheres, the adhesive/seasoning can be most uniformly disposed on the snack food, and by a very convenient method, e.g. simply tumbling or air blending. Once those small capsules are uniformly distributed, by raising the snack food to the melt temperature of the fat, the adhesive will be very uniformly dispersed on the snack food.

To achieve that encapsulation, as described above, an emulsifier is used. The emulsifier stabilizes the water-in-oil emulsion from which the encapsulated particles are formed. In addition, it may also be used to keep the fat in the adhesive in a well-dispersed state, while reaching the temperature which causes the amorphous state. The amount of the emulsifier for this latter purpose is not critical, so long as that function is obtained, but the fat should be at a level low enough so as to allow the phases to separate during the subsequent heating step when the melt temperature is reached. To keep the emulsifier at such low levels, it is preferred to use relatively high shear during the emulsification step, since the high shear will allow the proper emulsification without larger amounts of emulsifier. While this amount of emulsifier may vary considerably, depending on the particular emulsifier, generally speaking, from 0.5 to 3% of emulsifier, based on the total weight of the mixture, is satisfactory.

In regard to either the direct spray application method or the indirect encapsulated particles application method, the temperature to which the mixture is heated to achieve the amorphous state (substantially non-crystalline state) must be determined imperically. However, basically, the heating is to allow anomerization, e.g. to the alpha and to the beta isomers, e.g. glucose. Anomerization will assist the amorphous-caused supersaturation of the monosaccharide, as described above, especially during subsequent cooling, but without significant crystallization.

The alcohols, as noted above, deter crystallization of the monosaccharide. This is apparently by disrupting the hydrogen bonding during ordinary crystal formation. The alcohols also lower the viscosity of the at least partially amorphous adhesive, and, of course, it is necessary for the viscosity to be low enough that the adhesive is able to flow and bond with the seasoning and the snack food.

With some monosaccharides, the heating step to cause the amorphous state does not actually result in true solutions of the monosaccharide. However, the product can be considered a supersaturated solution at ambient temperatures, with good microbial stability. Even if a true solution is not reached, the heating can be conducted such that the amorphous state will, nonetheless, be achieved.

In regard to the form of the process using the encapsulated adhesive, when the snack food, with the encapsulated particles and seasoning thereon, is heated to above the melting point of the encapsulating fat, the phases, of course, separate. The amorphous monosaccharide/alcohol adhesive is imbibed by both the seasoning and the snack food, forming a continuous structure. Upon cooling, some of the monosaccharide will crystallize, usually, forming an irreversible bond of the seasoning and snack food. As noted above, this bond is important, but on the other hand, it is equally important that some of the adhesive remain in the amorphous state, since that state provides good bonding with flexibility so that with normal agitation encountered during the life of the product, the seasoning will not flake off.

From the foregoing, it can be appreciated that wide ranges of the ingredients of the adhesive may be used. However, typically the ranges of the ingredients will be as follows.

Monosaccharide will be about 5 to 70%, with a preferred range of about 20 to 70% for the direct application method, and 5 to 40% being the preferred range for the encapsulation method.

The alcohol will be from about 10 to 50%, with the preferred range for the direct application method being from about 20 to 40%, and the preferred range for the encapsulation method being about 5 to 40%.

The solvent, e.g. water, will usually be from about 1 to 25%, with up to about 25% in the direct application method and up to about 20% in the encapsulation method being preferred.

The salt, at least preferably used in the direct application method, will be up to about 15%.

The fat used in the direct application method, for providing an anti-stick to the apparatus, when used, will be up to about 15%.

The use of other salts for providing the protein gel, as described above, when used, especially in the direct application method, will be in amounts of about 0.5 to 8%.

Flavoring, when used, will be up to about 10%.

The fat used for encapsulation will range from about 35 to 85%, with about 60% being quite sufficient.

A typical and preferred formulation for the direct application method is as follows:

| | |
|---|---|
| Glycerol | 30% |
| Glucose | 45% |
| Water | 10% |
| Sodium Chloride | 7% |
| Soybean Oil (70-130° F. Melt) | 4% |
| Calcium Chloride | 2% |
| Flavor | 2% |

A typical and preferred formulation for the encapsulation form is as follows:

| | |
|---|---|
| Partially hydrogenated Soybean Oil (melt point 110-160° F.) | 60% |
| Emulsifier (Sodium Stearate) | 1% |
| Glucose | 24% |
| Glycerol | 10% |
| Water | 5% |

The invention will now be illustrated in regard to the following examples. In the examples, as well as in the foregoing disclosure and following claims, all percentages, ratios and parts are by weight, unless otherwise indicated. However, it will be apparent that the invention is not limited to the specific examples, but extends to the breadth of the foregoing disclosure.

EXAMPLE 1

Into a 1500 milliliter beaker was placed 30% glycerol, 45% glucose, 10% water, 7% sodium chloride, 4% partially hydrogenated soybean oil (125° F. melting point), 2% calcium chloride (in a 30% solution in water), and 2% fried fat flavor, with the total ingredients weighing 1000 grams. The beaker was placed on a hot plate with a magnetic stirrer, and the water, calcium chloride solution and salt, as described above, were added thereto with stirring. This mixture was heated to 180° F. with continued stirring. To the mixture was added the glycerol, glucose, oil and flavor, and, with stirring, the resulting mixture was heated to 250° F. At this temperature, the solution became somewhat translucent, and it was therefore determined that the amorphous-causing temperature had been reached.

The amorphous adhesive was cooled to ambient temperature (approximately 70° F.), and the adhesive had a consistency of viscous syrup.

To 130 grams of air-popped popcorn, was added 46 grams of cheese powder (Beatreme CT 113), 4 grams of sodium chloride, and 16 grams of the above-described adhesive. This addition was achieved by blending the cheese powder and salt together, and the popcorn was placed in a three gallon polyethylene bag. The adhesive was warmed on a hot plate to a temperature between 110° F. and 130° F., atomized into the bag with a conventional spray gun (Binks Model 62 with a No. 67 nozzle and a No. 367 needle). The pressure of the gun was 30 psi.

When the adhesive was being sprayed into the bag, containing the popcorn, the air flow from the spray nozzle agitated the popcorn in the bag and allowed even coating of the adhesive. The blend of cheese powder and salt were then tumbled in the bag for about 5 to 10 seconds and produced an even coating on the snack food, i.e. the popcorn.

EXAMPLE 2

An adhesive was prepared by mixing 60% partially hydrogenated soybean oil (melt range 110°-160° F.) and 1% sodium stearate emulsifier and heating the mixture to about 225° F., on a conventional hot plate. 24% of glucose, 10% of glycerol and 5% of water, all contained in a beaker, were heated on a hot plate to about 225° F. The heated combination of oil and emulsifier was then added thereto. This mixture was homogenized in a conventional laboratory homogenizer to form a water-in-oil emulsion thereof.

That emulsion was spray atomized in a conventional laboratory spray box with an entering air temperature of about 70° F. to produce fat microencapsulated adhesive.

7.5 grams of cheese powder (Beatreme CT 113) was mixed with 2.5 grams of the encapsulated adhesive. Conventional baked saltine crackers were placed in an oven at about 275° F. until they had equilibrated (about 45 seconds) and then removed from the oven. The encapsulated adhesive mixed with the cheese powder was dusted onto the hot crackers, and the hot crackers were allowed to cool. The cooled crackers had the cheese powder firmly adhered thereto.

As an alternate to this last step, the cheese powder and/or the adhesive can be dusted onto the crackers before heating, but this results in somewhat of a loss of the cheese flavor. Also, alternatively, the adhesive may be placed on the hot crackers separately from the cheese powder.

Having described the invention, it will be apparent to those skilled in the art that the invention admits to many modifications and variations. It is, therefore, the intention that such modifications and variations be within the described invention, as set forth by the scope of the annexed claims.

What is claimed is:

1. In a low fat content, seasoned, cereal-based snack food having a low fat and low moisture content edible adhesive on surfaces thereof and edible dry solids seasoning adhered to the surfaces by the adhesive, the improvement wherein the adhesive comprises an at least partially amorphous form of a mixture of at least one monosaccharide and at least one polyhydric, aliphatic, saturated alcohol having 3 to 6 carbon atoms.

2. The snack food of claim 1 wherein the monosaccharide is selected from the group consisting of aldopentoses, aldohexoses and ketohexoses and mixtures thereof.

3. The snack food of claim 2 wherein the monosaccharide is selected from the group consisting of glucose, mannose, galactose and fructose and mixtures thereof.

4. The snack food of claim 3 wherein the monosaccharide is glucose.

5. The snack food of claim 1 wherein the alcohol is selected from the group consisting of glycerol, sorbitol and mannitol and mixtures thereof.

6. The snack food of claim 5 wherein the adhesive is an at least partially amorphous form of a mixture of glucose and glycerol.

7. The snack food of claim 6 wherein the weight ratio of glucose to glycerol is between 0.5:1 to 8:1.

8. The snack food of claim 7 wherein the ratio is between 1:1 to 4:1.

9. The snack food of claim 1 wherein the adhesive also contains at least one edible salt.

10. The snack food of claim 9 wherein the salt is selected from the group consisting of sodium and calcium salts and mixtures thereof.

11. The snack food of claim 10 wherein the salt is selected from the group consisting of sodium and calcium chloride and mixtures thereof.

12. The snack food of claim 11 wherein the salts are both sodium chloride and calcium chloride.

13. The snack food of claim 1 wherein the adhesive also contains an edible fat.

14. The snack food of claim 13 wherein the fat is an oil.

15. The snack food of claim 14 wherein the oil is a vegetable oil.

16. The snack food of claim 15 wherein the vegetable oil is soybean oil.

17. The snack food of claim 13 wherein the weight ratio of the monosaccharide to fat is between 20:1 and 6:1.

18. A method for producing the snack food of claim 1, comprising:
(A) forming a mixture of the at least one monosaccharide and the at least one alcohol in a co-solvent therefor;
(B) heating the mixture to at least the amorphous-causing temperature and for a time sufficient to cause the mixture to become an at least partially amorphous mixture;
(C) cooling the amorphous mixture to a lower temperature where the viscosity and surface tension of the amorphous mixture substantially prevents absorption of the amorphous mixture into the snack food;
(D) spraying the amorphous mixture onto the snack food to coat surfaces of the snack food with the amorphous mixture;
(E) applying the seasoning to the so-coated snack food; and
(F) cooling the seasoned snack food to a temperature where the amorphous mixture is no longer substantially tacky; and
wherein the seasoning is substantially firmly adhered to the snack food.

19. The method of claim 18 wherein the co-solvent is water.

20. The method of claim 18 wherein the amorphous-causing temperature is at least 150° F.

21. The method of claim 20 wherein the amorphous-causing temperature is at least 200° F.

22. The method of claim 18 wherein the lower temperature is at least below 175° F.

23. The method of claim 22 wherein the lower temperature is at least above 120° F.

24. The method of claim 18 wherein the amorphous mixture is atomized in a spray device for spraying onto the snack food.

25. The method of claim 18 wherein the adhesive also contains seasonings.

26. A method for producing the snack food of claim 1, comprising:
(A) forming a mixture of the at least one monosaccharide, the at least one polyhydric alcohol, an edible fat having a melting point between about 100° F. and 165° F., and an emulsifier for the fat;
(B) stirring and heating the mixture to at least the amorphous-causing temperature for a time sufficient to cause the mixture to become amorphous and to form a solvent-in-oil emulsion;
(C) atomizing the emulsion to encapsulate the amorphous mixture in the fat and provide small particles thereof;
(D) blending the particles with the snack food and the seasoning to form a blend thereof;
(E) heating the blend to a melt temperature sufficient to cause the fat to melt and distribute the amorphous mixture over the snack food and to adhere the seasoning to the snack food to provide seasoned snack food;
(F) cooling the seasoned snack food to a temperature where the amorphous mixture is no longer substantially tacky; and
wherein the seasoning is substantially firmly adhered to the snack food.

27. The method of claim 26 wherein the co-solvent is water.

28. The method of claim 26 wherein the amorphous-causing temperature is at least 150° F.

29. The method of claim 28 wherein the amorphous-causing temperature is at least 200° F.

30. The method of claim 26 wherein the fat is a hydrogenated soybean oil.

31. The method of claim 26 wherein the emulsifier is a monoglyceride or sodium stearate.

32. The method of claim 30 wherein the fat has a melting point between 110° F. and 165° F.

33. The method of claim 26 wherein the stirring is by homogenization.

34. The method of claim 25 wherein the particles have an average particle size of between 1 and 500 microns.

35. The method of claim 26 wherein the melt temperature is at least 100° F.

36. The method of claim 26 wherein the melt temperature is at least 125° F.

37. The method of claim 26 wherein the adhesive also contains seasonings.

* * * * *